July 29, 1941.  W. L. GROENE  2,250,632
HYDRAULIC CHUCKING MECHANISM
Filed March 22, 1940   2 Sheets-Sheet 2
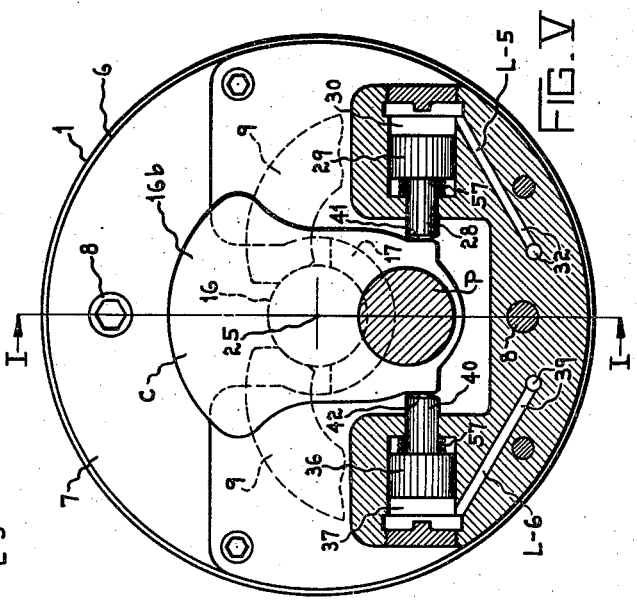
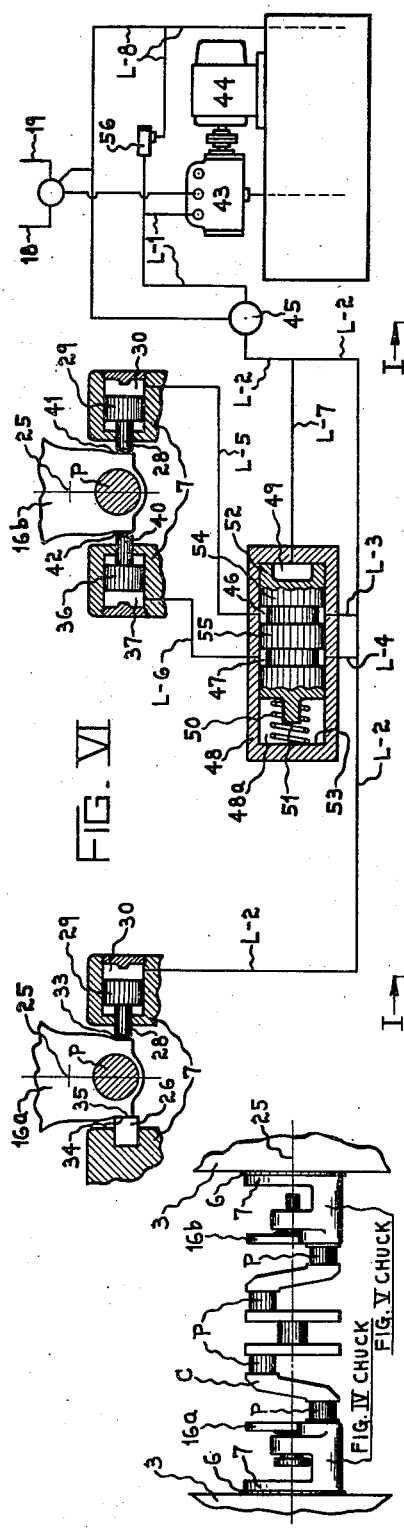
INVENTOR.
Willard L. Groene Patented July 29, 1941

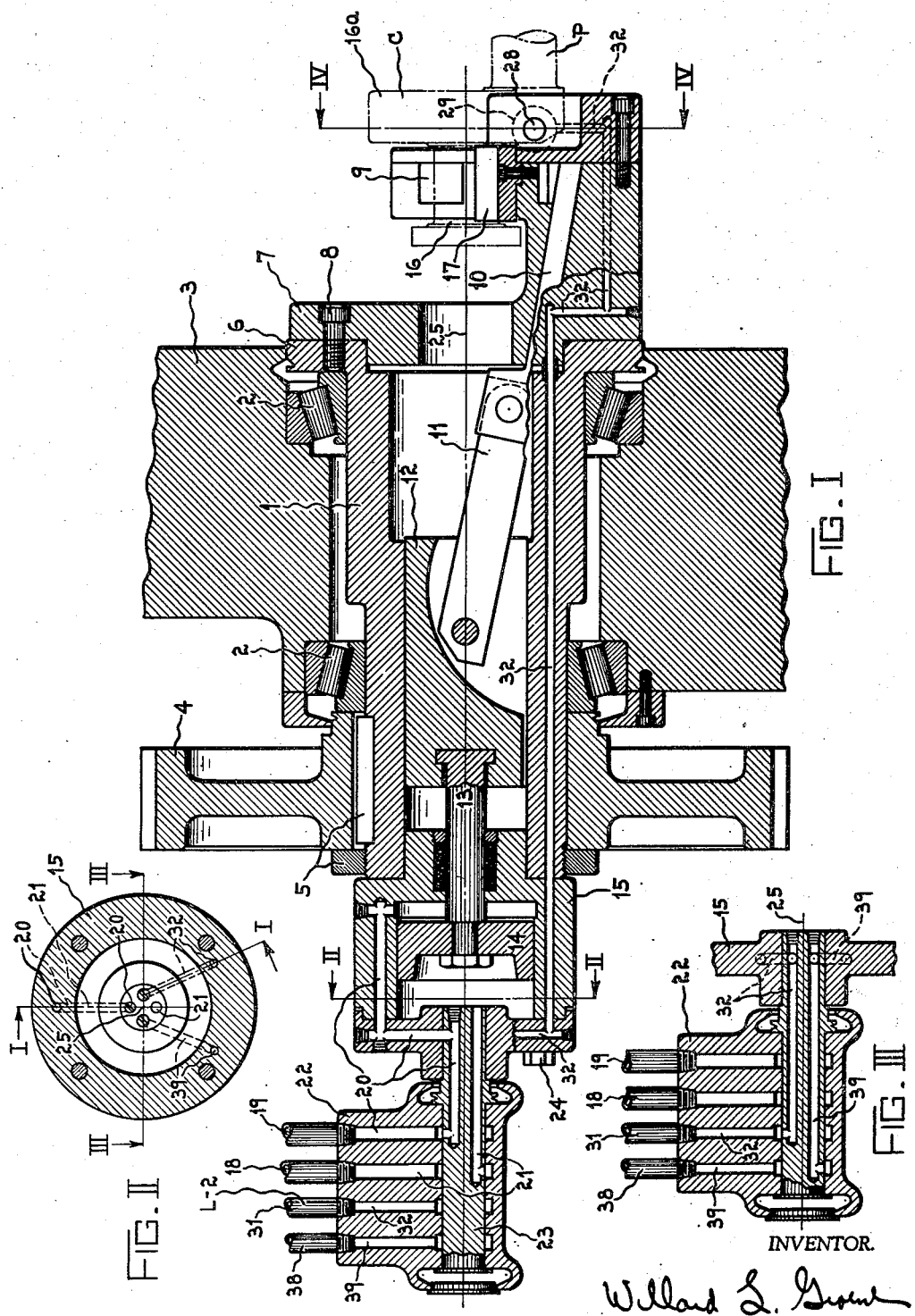

2,250,632

UNITED STATES PATENT OFFICE 2,250,632

HYDRAULIC CHUCKING MECHANISM

Willard L. Groene, Cincinnati, Ohio, assignor to The R. K. Le Blond Machine Tool Company, Cincinnati, Ohio, a corporation of Delaware Application March 22, 1940, Serial No. 325,420

15 Claims. (Cl. 82—40)

This invention pertains to the chucking of work in machine tools by means of fluid pressure operated apparatus, and is particularly related to the chucking of crankshafts for multi-cylinder internal combustion engines in chucking devices of crankshaft lathes in order to machine the various bearing portions of such crankshafts. More specifically, this invention pertains to the chucking of crankshafts in orbital crank pin turning lathes of a type, for example, as shown in Patent #1,934,530, dated November 7, 1933, this particular invention being related to improvements in chucking devices for such lathes of a character as set forth in Patent #2,030,142, dated February 11, 1936.

In the chucking devices of such lathes it has formerly been the practice to chuck the crankshafts by means of previously machined end line bearings of the crankshaft, which properly centered the shaft on the axis of rotation of the lathe. The crankshaft was then accurately circumferentially positioned in the chuck for proper indexed relationship to the chucks and to the orbitally moving tool carrying devices of the lathe by first providing pre-machined locating surfaces on the rough irregular terminal webs of the crankshaft, and to provide accurately positioned mating abutment surfaces in the chucks to engage these machined surfaces on the webs to effect this accurate indexing of the shaft. Such practice was followed in the chucking device at each end of the shaft so that both ends of the shafts were mounted in proper indexed relationship in the chucking devices.

It has been found however, that difficulty is encountered in properly accurately machining these locating surfaces on the rough irregular webs with the necessary accuracy and high production to make this practice efficient. It is therefore one of the primary objects of this invention to provide an arrangement in conjunction with such lathes and chucking devices where the pre-machining of these locating surfaces on the rough irregular webs is entirely dispensed with, while at the same time providing the high degree of accuracy of positioning of the shaft in the lathe and also the rigid supporting of the shaft at both ends against any twisting or axial distortion of the shaft from its proper position in the chuck during application of the cutting tools to the various bearing portions of the crankshaft.

One object of this invention is to provide in a chucking device, means for engaging a pre-machined cylindrical portion of a work piece to properly center the work piece in the chucking device and to provide in conjunction with said centering and supporting device, hydraulically operated abutment means for accurately positioning the work piece circumferentially or in indexed position in the chucking devices.

Another object of this invention is to provide in a crankshaft lathe for multi-throw internal combustion engine crankshafts, a pair of chucking devices for gripping such crankshafts at each end, whereby the crankshaft is accurately centered in the lathe containing said chucking devices by gripping said crankshafts by means of the pre-machined end line bearings and then to provide hydraulically operated plungers which engage rough irregular surfaces of the crankshaft to effect the accurate and rigid indexing of the crankshaft in the chucking devices during the cutting operation of the lathe on the work crankshafts.

Another object of this invention is to provide in a crankshaft lathe, a pair of chucking devices for engaging a crankshaft to be machined by means of its end line bearings and to provide in one of said chucking devices a fixed abutment and a fluid pressure actuated plunger which forces a web portion of said crankshaft against said fixed abutment for accurately positioning said crankshaft in proper indexed relationship in both chucking devices. It is then the object to provide in the other chucking device a pair of opposed fluid pressure operated abutments which may engage said work crankshaft by means of rough irregular surfaces thereof, with high pressure without in any way distorting it from its true indexed position initially effected by said first chucking device and then to provide means for positively locking said fluid actuated abutments in said second chuck by means of hydraulically operated mechanism.

Further features and advantages of this invention will be set forth in the detailed description of the drawings in which:

Figure I is a cross section on the axis of rotation of one of the work spindles showing the general arrangement of fluid pressure operating mechanism and the mounting of the work spindle and chucking device thereon, substantially on the line I—I of Figures II, IV, and V.

Figure II is a detailed cross section through the hydraulic actuating cylinder for the clamping mechanism of the chucking device substantially on the line II—II of Figure I.

Figure III is a diagrammatic section substantially like that of Figure I on the line III—III of Figure II, showing the arrangement of the passageways for delivering fluid pressure to the indexing mechanism on the rotatable work spindle from a stationary source of fluid pressure.

Figure IV is an end view substantially on the line IV—IV of Figure I showing the fixed locating abutment and the single fluid pressure actuated plunger for holding the work against this abutment.

Figure V is an end view of the other chucking device showing the two opposed fluid pressure operated plungers.

Figure VI is a diagrammatic circuit diagram of the hydraulic operating system for the fluid pressure operated indexing mechanism for both of the chucking devices.

Figure VII is a diagrammatic view showing the general arrangement of each of the chucking devices on the ends of a multi-throw crankshaft chucked in the devices.

For illustrative purposes, this invention is shown applied to the work spindles of a crank pin turning lathe of a character shown in the Patent #1,934,530 having a pair of work spindles on the axis of rotation of the lathe, and having a chucking device on each of said spindles for gripping the ends of a multiple-throw crankshaft to be machined of a character shown in the Patent 2,030,142. In order to simplify the description only one of the work spindles and chuck assemblies is shown, there being no material difference in the general arrangement of the fluid pressure actuating mechanism for the clamping means to hold the pre-machined end line bearings on the half bearings of the chucks on each of the work spindles, the essential difference lying in the fluid pressure abutment actuating means as clearly shown for the one chuck in Figure IV and for the other chuck in Figure V.

Each of the work spindles 1 is mounted in appropriate bearings 2 in the machine frame 3 and is driven in synchronism by appropriate gearing 4, fixed on the work spindle by suitable means 5 and rotated in synchronism with the orbitally moving tool carrier mechanism of the orbital lathe in a manner fully disclosed in the above mentioned patent. On the spindle 1 is formed the flange 6 to which is bolted the chuck body 7 by suitable screws 8 of the chucking device for each work spindle. In the chuck bodies 7 are the usual arcuate clamping members 9 which are actuated by means of the cam bar 10 connected by suitable linkage 11 and cross head 12 to the piston rod 13, of the piston 14, in the fluid pressure clamping cylinder 15, in a manner fully described in the above mentioned chuck Patent 2,030,142. These arcuate clamping members 9 engage against the machined end line bearing portions 16 of a multi-throw crankshaft C, the crankshaft being supported in the half bearing 17 fixed in the chuck body 7 of each of the chucks, as is fully described in the above Patent 2,030,142 and as is common practice in pot chuck devices for crankshafts.

Fluid pressure for actuating the piston 14 is delivered through one or the other of the fluid pressure supply lines 18 and 19, through the passageways 20 and 21, as best shown in Figures I and II from the distributing block 22 non-rotatively mounted on the machine frame and is carried on the rotatable fluid pressure supply spindle 23 fixed in the fluid pressure clamping cylinder 15 mounted on the work spindle 1 by suitable screws 24 as is clearly set forth in the above mentioned chuck Patent 2,030,142. By applying fluid pressure through the line 18 the piston 14 is moved to the right, Figure I to push the cam bar 10 to the right thereby causing the arcuate clamping members 9 to swing toward each other to engage the machined line bearing portion 16 of the crankshaft C securely forcing it into the half bearing 17 and thus securely locking and centering the crankshaft on the axis of rotation 25 of the lathe spindle.

Having thus securely centered the crankshaft on the axis of rotation 25 of the lathe by means of its pre-machined line bearings 16, it is then the problem to provide means for accurately circumferentially positioning or indexing the crankshaft C with relation to the rotative position of the chucking devices and orbitally moving tool carrying members of the lathe. It is also necessary in conjunction with such apparatus to provide a positive means for holding and driving the crankshaft so that it will not turn in the half-bearings 17 during the cutting operation of the cutting tools on the various crank pins P of the crankshaft. This is accomplished in the present invention by hydraulically actuated mechanism best shown in Figures IV and V, in which in one of the chucks is provided a fixed abutment block 26 securely held to the chuck body 7 by an appropriate screw 27. Directly opposite and opposing this fixed abutment block is a fluid pressure actuated plunger 28 having a piston 29 operating in a cylinder 30 formed in the chuck body 7 and connected to a fluid pressure supply line 31 connected to the floating distributing block 22 through the passageways 32, as best seen by reference to Figures I, II, III and IV. When fluid pressure is applied to the line 32 the piston 29 will be urged to the left, Figure IV, to cause the plunger 28 to move outwardly to engage the rough abutment surface 33 of the crankshaft web 16a of the crankshaft C rotating the crankshaft clockwise in the half bearing 17 to force it with its abutment surface 34 up against the surface 35 of the abutment block 26 which accurately limits the indexed position of the crankshaft C with respect to the chuck body 7 and the orbital tool mechanism of the lathe.

In the other chuck at the opposite end of the crankshaft is provided a pair of plungers 28 and 40 having pistons 29 and 36 each carried in respective cylinders 30 and 37 formed in the chuck body 7 and respectively connected to the lines 31 and 38 through the respective passageways 32 and 39 as best seen in Figures I, II, III, and V. In this second chuck shown in Figure V, fluid pressure is applied to both of the cylinders 30 and 37 simultaneously with equal pressure urging their respective plungers 28 and 40 against the rough unmachined abutment surfaces 41 and 42 of the crankshaft web 16b of the crankshaft C so that the web is bound between these plungers under heavy pressure but is not twisted or turned in the half bearings 17 of the chucks since the pressure in the two cylinders 30 and 37 are balanced and equalized so that the crankshaft will not be twisted from the original position established in the chuck of Figure IV.

The operation of this chucking mechanism can best be understood by considering Figure VI. After the crankshaft has been placed with its end line bearings 16 in the half bearings 17 of each chuck, fluid pressure is then applied from a suitable source, for example, the fluid pressure pump 43, driven by a suitable electric motor 44 to the line 18, Figure I, to urge the piston 14 forward in both of the work spindles to thereby effect the clamping of the work engaging members 9 upon the end line bearings 16 of the crankshaft securely holding the shaft in the half bushings 17 to thereby properly center the crankshaft on the axis of rotation 25 of the lathe. Having thus centered these crankshafts the fluid pressure indexing and driving mechanism is then operated as follows:

Fluid pressure from the pump 43 is delivered through the line L—1 to the control valve 45, which valve is at this time set so that fluid pressure from the line L—1 will be connected to the line L—2 which line is directly connected to the cylinder 30 for the plunger 29 in the chuck of Figure IV so as to immediately force the web 16a with its surface 34 against the surface 35 of the fixed abutment 26 in this chuck to thereby properly index the crankshaft in the chucking devices with respect to the orbital lathe mechanism. Also connected to the line L—2 are the lines L—3 and L—4 which are connected to ports 46 and 47 respectively of the automatic shuttle control valve 48. Out of each of these ports 46 and 47 pass the lines L—5 and L—6 respectively, the line L—5 being connected to the cylinder 30 and the line L—6 being connected to the cylinder 37 of the chuck of Figure V. Normally at the beginning of application of fluid pressure to the line L—2, effected by appropriately operating the control valve 45, the plunger 28 in the Figure IV chuck will first swing the crankshaft up against the abutment block 26, after which the plungers 29 and 36 in the Figure V chuck will then securely seat themselves against the respective surfaces 41 and 42 on the crankshaft web, without in any way twisting or distorting the crankshaft web 16b relative to the crankshaft web 16a, as established initially in the chuck of Figure IV by the abutment 26. As soon as all of these three plungers have engaged themselves on the respective crankshaft webs 16a and 16b, back pressure will build up in the lines L—2, L—5, and L—6, creating similar pressure in the line L—7 connected to the actuating chamber 49 of the shuttle control valve 48 causing its plunger 52 to be urged to the left, Figure VI, compressing the return spring 50 of the valve until the abutment end 51 of the valve plunger 52 strikes the bottom 53 of the cylinder 48a of the valve 48 arresting further movement of the plunger. After the plunger 52 has thus been moved by pressure through the line L—7 the diameter portions 54 and 55 of the plunger 52 respectively cut off the lines L—5 and L—6 sealing these lines against any exhausting of fluid from the respective cylinders 30 and 37 of the chuck of Figure V so that these plungers cannot be moved outwardly by any force applied to the crankshaft C under these conditions. It is also practical to have a third port arrangement in the shuttle valve 48 to similarly shut off the line L—2 to the cylinder 30 in the chuck of Figure IV, to confine the fluid in this cylinder, but ordinarily the pressure from the pump 43 may be maintained sufficiently high in this cylinder 30 to hold the crankshaft web 16a against the abutment block 26 during the cutting action of the tools on the crankshaft bearings. Pressure is maintained at all times during the cutting operation on the crankshaft with the plunger moved to the left with its abutment 51 striking the bottom 53 of the cylinder of the valve 48, the excess fluid pressure escaping through a suitable relief valve 56 through a drain line L—8 of the fluid pressure system. It is also practical to provide the fixed abutment or the equivalent in the chuck of Figure V in conjunction with the pair of plungers in this chuck.

In this way the crankshaft is accurately and positively indexed in the chucking devices in proper position relative to the orbitally moving tool mechanism of the lathe and also both ends of the crankshaft are rigidly chucked in this accurately indexed position without springing or twisting of the shaft while at the same time providing a positive abutment means at both ends of the crankshaft for effecting proper rotation of the crankshaft with the chuck during the cutting action of the tools on the work.

At the completion of the cutting cycle the crankshaft is removed from the chucking devices by actuating the control valve 45 so as to connect the line L—2 and therefore the line L—1 to the drain line L—8 permitting the plunger 52 of the shuttle valve 48 to move back to the position shown in Figure VI under the action of the return spring 50 thus releasing all pressure from the respective lines L—2, L—5 and L—6 and L—7 so that fluid pressure may again pass out of the cylinder 30 of the chuck of Figure IV and out of the cylinders 30 and 37 of the chuck of Figure V under the action of the return spring 57 associated with the plungers of each of said cylinders.

Having thus fully set forth and described my invention, what I claim and desire to secure by United States Letters Patent is:

1. In a chucking device, a rotary chuck body, means for positioning a work piece on the axis of rotation of said chuck body, a pair of opposed fluid pressure actuated plungers in said chuck body movable in opposed relation to each other to engage said work piece, and means for simultaneously applying fluid pressure to said plungers from a common source of supply.

2. In a chucking device, a rotary chuck body, means for positioning a work piece on the axis of rotation of said chuck body, a pair of opposed fluid pressure actuated plungers in said chuck body movable in opposed relation to each other to engage said work piece, means for simultaneously applying fluid pressure to said plungers from a common source of supply, and means for independently maintaining said fluid pressure on each of said plungers after said fluid pressure has been simultaneously applied from said common source of supply.

3. In a chucking device, a rotary chuck body, means for positioning a work piece on the axis of rotation of said chuck body, means on said chuck body for limiting circumferential rotation of said work piece about said axis relative to said chuck body, a pair of opposed fluid pressure actuated plungers in said chuck body movable in opposed relation to each other to engage said work piece, and means for simultaneously applying fluid pressure to said plungers from a common source of supply.

4. In a chucking device, a rotary chuck body, means for positioning a work piece on the axis of rotation of said chuck body, means on said chuck body for limiting circumferential rotation of said work piece about said axis relative to said chuck body, a pair of opposed fluid pressure actuated plungers in said chuck body movable in opposed relation to each other to engage said work piece, means for simultaneously applying fluid pressure to said plungers from a common source of supply, and means for independently maintaining said fluid pressure on each of said plungers after said fluid pressure has been simultaneously applied from said common source of supply.

5. In a work holding device, means for prelocating a work piece in said device, and means for gripping said work piece and rigidly holding it accurately in said position comprising fluid pressure actuated work engaging members, means for simultaneously applying fluid pressure to said members from a common source of supply of fluid pressure to engage said work engaging members on said work piece, and means for locking said members by fluid pressure after said members are engaged on said work piece.

6. In a work holding device, means for prelocating a work piece in said device, and means for gripping said work piece and rigidly holding it accurately in said position comprising fluid pressure actuated work engaging members, operating in cylinders in said device, means for simultaneously applying fluid pressure to said cylinders from a common source of supply of fluid pressure to engage said work engaging members on said work piece, and means for independently confining said fluid pressure in each of said cylinders after said members are engaged on said work piece.

7. In a crankshaft chuck, a rotary chuck body, a half bearing fixed in said chuck body adapted to engage a bearing portion of a crankshaft to be held in said chuck, clamping means for holding said bearing portion in said half bearing, fluid pressure means for actuating said clamping means, a fixed abutment on said chuck body adapted to engage a portion of said crankshaft to limit rotation of said bearing portion in said half bearing, a plunger adapted to engage another portion of said crankshaft, and fluid pressure for actuating said plunger, after the operation of said clamping means, to hold said crankshaft in engagement with said abutment.

8. In a crankshaft chuck, a rotary chuck body, a half bearing fixed in said chuck body adapted to engage a bearing portion of a crankshaft to be held in said chuck, clamping means for holding said bearing portion in said half bearing, fluid pressure means for actuating said clamping means, a fixed abutment on said chuck body adapted to engage a portion of said crankshaft to limit rotation of said bearing portion in said half bearing, a plunger operating in a cylinder in said chuck body adapted to engage another portion of said crankshaft to hold said crankshaft in engagement with said abutment, and means for confining said fluid pressure in said cylinder after said plunger has engaged said crankshaft.

9. In a crankshaft chuck, a rotary chuck body, a half bearing fixed in said chuck body adapted to engage a bearing portion of a crankshaft to be held in said chuck, clamping means for holding said bearing portion in said half bearing, fluid pressure means for actuating said clamping means, a pair of plungers adapted to engage said crankshaft from opposite directions, and fluid pressure means for actuating said plungers to engage them on said crankshaft to prevent rotation of the bearing portion of said crankshaft in said half bearing.

10. In a crankshaft chuck, a rotary chuck body, a half bearing fixed in said chuck body adapted to engage a bearing portion of a crankshaft to be held in said chuck, clamping means for holding said bearing portion in said half bearing, fluid pressure means for actuating said clamping means, a pair of plungers operating in cylinders in said chuck body adapted to engage said crankshaft from opposite directions, fluid pressure means for actuating said plungers to engage them simultaneously on said crankshaft, and means for independently confining said fluid pressure in each of said cylinders after said plungers have engaged said crankshaft to prevent rotation of said bearing portion in said half bearing.

11. In a crankshaft chucking mechanism, a half bearing adapted to engage a bearing portion of a crankshaft to center and axially align a crankshaft in said mechanism, clamping means for holding said bearing portion in said half bearing, fluid pressure means for actuating said clamping means, means adapted to engage a portion of said crankshaft to limit rotation of said bearing portion in said half bearing, a pair of plungers operating in cylinders provided in said mechanism adapted to engage said crankshaft from opposite directions, fluid pressure means for actuating said plungers to engage them simultaneously on said crankshaft, and means for independently confining said fluid pressure in each of said cylinders after said plungers have engaged said crankshaft.

12. In a chucking mechanism for crankshaft lathes, a pair of coaxially arranged synchronously rotatable work spindles, a chucking device on each of said work spindles, each adapted to engage an end of a crankshaft to be chucked, means in each of said chucking devices for centering and axially aligning said crankshaft on said work spindles, means in one of said chucking devices for circumferentially positioning said crankshaft relative to said chucking devices, and fluid pressure operating means in the other of said chucking devices for engaging and positively locking said crankshaft against circumferential movement relative to said other of said chucking devices without distorting said crankshaft from the circumferential position determined by the circumferential positioning mechanism in the first mentioned chuck.

13. In a chucking mechanism for crankshaft lathes, a pair of coaxially arranged synchronously rotatable work spindles, a chucking device on each of said work spindles, each adapted to engage an end of a crankshaft to be chucked, means in each of said chucking devices for centering and axially aligning said crankshaft on said work spindles, comprising half bearings adapted to engage bearing portions on the ends of said crankshaft, clamping means in each of said chucking devices for holding said bearing portions in said half bearings, fluid pressure means for actuating said clamping means, a fixed web engaging abutment and a fluid pressure actuated web engaging plunger for holding a web of said crankshaft against said abutment to index said crankshaft in said chucking devices, a pair of opposed fluid pressure actuated web engaging plungers in said other chucking device adapted to engage a web of said crankshaft from opposite sides, fluid pressure means for actuating said web engaging plungers, and fluid pressure means for rigidly locking said plungers in the other chucking device when fully engaged in the web of said crankshaft.

14. In a chucking mechanism for crankshaft lathes, a pair of coaxially arranged synchronously rotatable work spindles, a chucking device on each of said work spindles, each adapted to engage an end of a crankshaft to be chucked, means in each of said chucking devices for centering and axially aligning said crankshaft on said work spindles, comprising half bearings adapted to engage bearing portions on the ends of said crankshaft, clamping means in each of said chucking devices for holding said bearing portions in said half bearings, fluid pressure means for actuating said clamping means, a fixed web engaging abutment and a fluid pressure actuated web engaging plunger for holding a web of said crankshaft aainst said abutment to index said crankshaft in said chucking devices, a pair of opposed fluid pressure actuated web engaging plungers in said other chucking device adapted to engage a web of said crankshaft from opposite sides, a source of fluid pressure, a pipe line connecting each of said fluid pressure actuated plungers to said source of fluid pressure, a control valve for disconnecting fluid pressure from said source to said plungers to permit discharge of fluid from said plungers through said pipe lines, and a shuttle valve connected across the pipe lines from the pair of plungers adapted to close off said lines from said control valve and said source of fluid pressure.

15. In a chucking mechanism for crankshaft lathes, a pair of coaxially arranged synchronously rotatable work spindles, a chucking device on each of said work spindles, each adapted to engage an end of a crankshaft to be chucked, means in each of said chucking devices for centering and axially aligning said crankshaft on said work spindles, comprising half bearings adapted to engage bearing portions on the ends of said crankshaft, clamping means in each of said chucking devices for holding said bearing portions in said half bearings, fluid pressure means for actuating said clamping means, a fixed web engaging abutment and a fluid pressure actuated web engaging plunger for holdin a web of said crankshaft against said abutment to index said crankshaft in said chucking devices, a pair of opposed fluid pressure actuated web engaging plungers in said other chucking device adapted to engage a web of said crankshaft from opposite sides, a source of fluid pressure, a pipe line connecting each of said fluid pressure actuated plungers to said source of fluid pressure, a control valve for disconnecting fluid pressure from said source to said plungers to permit discharge of fluid from said plungers through said pipe lines, and a shuttle valve, connected across the pipe lines from the pair of plungers and actuated by the back pressure in the supply lines from said source of fluid pressure when all of said plungers engage the webs of said crankshaft, adapted to close off said lines from said control valve and said source of fluid pressure.

WILLARD L. GROENE.